United States Patent
Fornof et al.

(10) Patent No.: US 7,285,149 B2
(45) Date of Patent: Oct. 23, 2007

(54) OIL SEPARATOR FOR VEHICLE AIR SYSTEM

(75) Inventors: William P. Fornof, Girard, PA (US); Gregory R. Ashley, Amherst, OH (US); Leonard A. Quinn, Lagrange, OH (US); Fred W. Hoffman, Columbia Station, OH (US); Gregory C. Smith, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 36 days.

(21) Appl. No.: 10/698,571

(22) Filed: Oct. 31, 2003

(65) Prior Publication Data

US 2005/0092180 A1    May 5, 2005

(51) Int. Cl.
*F02M 25/06*    (2006.01)
(52) U.S. Cl. .................. 55/385.3; 55/337; 55/417; 55/428; 55/457; 55/DIG. 19; 96/190; 96/419; 96/421; 123/572; 123/573; 123/574; 123/196 A
(58) Field of Classification Search ............... 55/316, 55/387, 337, 385.3, 417, 428, 457, DIG. 19; 96/190, 421, 419; 123/572–574, 196 A
See application file for complete search history.

(56) References Cited

U.S. PATENT DOCUMENTS

| | | | | |
|---|---|---|---|---|
| 2,036,106 A | * | 3/1936 | Stuard | 137/204 |
| 3,934,238 A | * | 1/1976 | Pavlou | 340/611 |
| 4,551,069 A | | 11/1985 | Gilmore | |
| 4,645,887 A | | 2/1987 | Whiting | |
| 4,690,759 A | * | 9/1987 | Mandy | 210/304 |
| 4,692,175 A | * | 9/1987 | Frantz | 96/408 |
| 4,877,422 A | * | 10/1989 | Walbridge et al. | 95/25 |
| 4,892,569 A | * | 1/1990 | Kojima | 96/113 |

(Continued)

FOREIGN PATENT DOCUMENTS

DE    101 62 575 A1    7/2002

(Continued)

OTHER PUBLICATIONS

PURAGUARD System Filter, Honeywell Commercial Vehicle Systems Company, Jun. 2000, USA.

*Primary Examiner*—Duane Smith
*Assistant Examiner*—Minh-Chau T. Pham
(74) *Attorney, Agent, or Firm*—Calfee, Halter & Griswold, LLP (57) ABSTRACT

An oil separator for use in a vehicle air system includes a recycling valve for removing coalesced oil. The recycling valve may include a piston movable in a cylinder in response to a control air pressure to open the recycling valve and thus drain coalesced oil from a sump under the influence of residual air pressure in the sump. The separator may include a fixture for mounting the separator to a vehicle, including a plurality of ports extending from an inlet port for directing air into the cartridge with a combined flow area at least equal to the flow area of the inlet port. The plurality of ports preferably extend at a right angle to the direction of flow of air through the inlet port. A safety relief valve on the separator releases air when the pressure exceeds a predetermined pressure.

35 Claims, 9 Drawing Sheets

U.S. PATENT DOCUMENTS

| | | | |
|---|---|---|---|
| 5,037,454 A | 8/1991 | Mann | |
| 5,121,599 A | 6/1992 | Snyder et al. | |
| 5,170,640 A * | 12/1992 | Heitmann et al. | 62/470 |
| 5,294,407 A * | 3/1994 | Succi et al. | 422/119 |
| 5,334,230 A * | 8/1994 | Sloka | 96/113 |
| 5,439,588 A | 8/1995 | Chown et al. | |
| 5,476,073 A * | 12/1995 | Betts | 123/73 AD |
| 5,564,401 A * | 10/1996 | Dickson | 123/573 |
| 5,718,744 A * | 2/1998 | Ehlert | 96/189 |
| 5,750,024 A | 5/1998 | Spearman | |
| 5,871,564 A * | 2/1999 | McCombs | 95/98 |
| 6,139,725 A | 10/2000 | Barr et al. | |
| 6,165,355 A | 12/2000 | Coulonvaux et al. | |
| 6,280,492 B1 * | 8/2001 | Binder et al. | 55/350.1 |
| 6,527,839 B2 | 3/2003 | Fornof et al. | |
| 6,860,915 B2 * | 3/2005 | Stegmaier et al. | 55/337 |
| 6,918,939 B2 * | 7/2005 | Dworatzek et al. | 55/313 |
| 2002/0129586 A1 * | 9/2002 | Tanaka | 55/320 |
| 2003/0136264 A1 * | 7/2003 | Keller | 95/277 |
| 2004/0031386 A1 * | 2/2004 | Rauchfuss et al. | 95/1 |
| 2004/0261776 A1 * | 12/2004 | Knaus et al. | 123/572 |
| 2005/0005582 A1 * | 1/2005 | Gieseke et al. | 55/330 |

FOREIGN PATENT DOCUMENTS

WO  PCT/US2004/036034   10/2004

* cited by examiner

OIL SEPARATOR FOR VEHICLE AIR SYSTEM

FIELD OF THE INVENTION

The present invention relates to a vehicle air system and specifically to an oil separator for removing oil from compressed air used in the system.

BACKGROUND OF THE INVENTION

An oil separator is conventionally used with vehicle compressed air systems to clean contaminants, such as lubricating oil, from the air pumped from the compressor. An oil separator may significantly restrict the flow of air through the air brake system if it becomes clogged with carbon from the oil in the compressed air. Restricting the flow of air causes significant back pressure which can cause damage to the compressor.

In addition, the air brake system typically includes an air dryer downstream of the compressor, with a replaceable cartridge. The lifespan of the air dryer cartridge is determined in large measure by how much oil is entrained in the air delivered to the air dryer. Too much oil, or even small amounts of oil, inside the air dryer will negatively affect the performance of the air dryer and increase the frequency of the maintenance service required on the air dryer. The separator preferably removes as much oil as possible from the air in the system. Oil that is removed from the system is typically dumped or wasted, which can be costly and environmentally damaging.

SUMMARY OF THE INVENTION

In one aspect the present invention relates to an oil separator for use in a vehicle air system. The separator includes a fixture for mounting the oil separator to a vehicle, an oil separator cartridge attached to the fixture for coalescing oil in air supplied to the oil separator, and a recycling valve for removing coalesced oil from the oil separator. The recycling valve may include a piston movable in a cylinder in response to a control air pressure to open the recycling valve. The recycling valve may include an inlet port in fluid communication with the cartridge through a sump and also an outlet port. The piston may be movable in response to a control air pressure from the closed position to an open position enabling fluid to flow out of the sump through the inlet port and the outlet port.

In another aspect the invention relates to a method including the steps of directing compressed air into a cartridge of an oil separator to coalesce oil in the compressed air, collecting the coalesced oil in a sump attached to the oil separator, and opening a recycling valve attached to the sump to enable coalesced oil to flow out of the sump. The method may also include the step of forcing the coalesced oil to flow out of the sump through the recycling valve under air pressure from the sump.

In a further aspect, the present invention relates to an oil separator for use in a vehicle air system, including a fixture for mounting the oil separator to a vehicle, and an oil separator cartridge attached to the fixture for coalescing oil in air supplied to the oil separator. The fixture includes an inlet port for allowing air from a compressor into the fixture and a delivery port for allowing air to exit the oil separator after being cleaned. The fixture also includes a plurality of ports extending from the inlet port for directing air from the inlet port into the cartridge. The plurality of ports have a combined flow area at least equal to the flow area of the inlet port. The plurality of ports preferably extend at a right angle to the direction of flow of air through the inlet port. The fixture may be made from a single piece of metal.

In a further aspect, the present invention relates to an oil separator for use in a vehicle air system, including a fixture for mounting the separator to a vehicle, an inlet port for allowing air from a compressor into said fixture, and a delivery port for allowing air to exit said oil separator after being cleaned. The fixture includes a pressure relief valve in fluid communication with the inlet port for releasing air from the oil separator in response to air pressure reaching a predetermined amount.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

Figure 1:
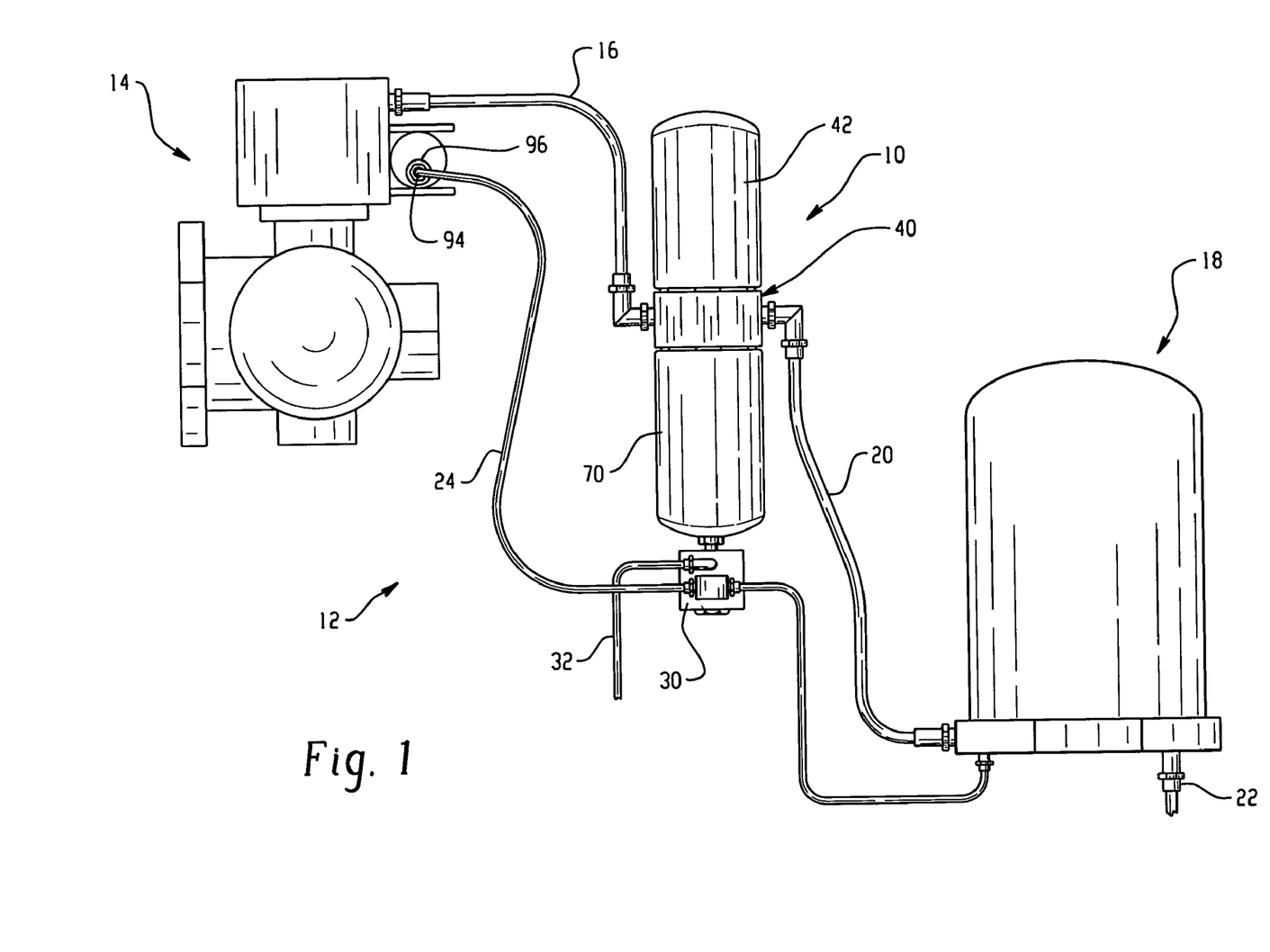
FIG. 1 is a schematic illustration of a vehicle braking system including an oil separator in accordance with the present invention.

The present invention relates to a vehicle air system and specifically to an oil separator for removing oil from compressed air used in the system. The present invention is applicable to oil separators of varying constructions. As representative of the invention, FIG. 1 illustrates an oil separator 10 constructed in accordance with a first embodiment of the invention.

The separator 10 forms part of a vehicle air braking system 12. The vehicle braking system 12 also includes a compressor 14. The compressor 14 supplies air to the separator 10 through an air line 16. Clean air from the separator 10 flows to an air dryer 18 through another air line 20. Dry air from the dryer 18 flows to the vehicle brakes (and other accessories) through an outlet fitting 22 on the air dryer. Another air line 24 from the compressor 14 is connected with a recycling valve 30 on the separator 10, to supply a control signal as described below. The system 12 also includes a return oil line 32 extending from the recycling valve 30.

Figure 2:
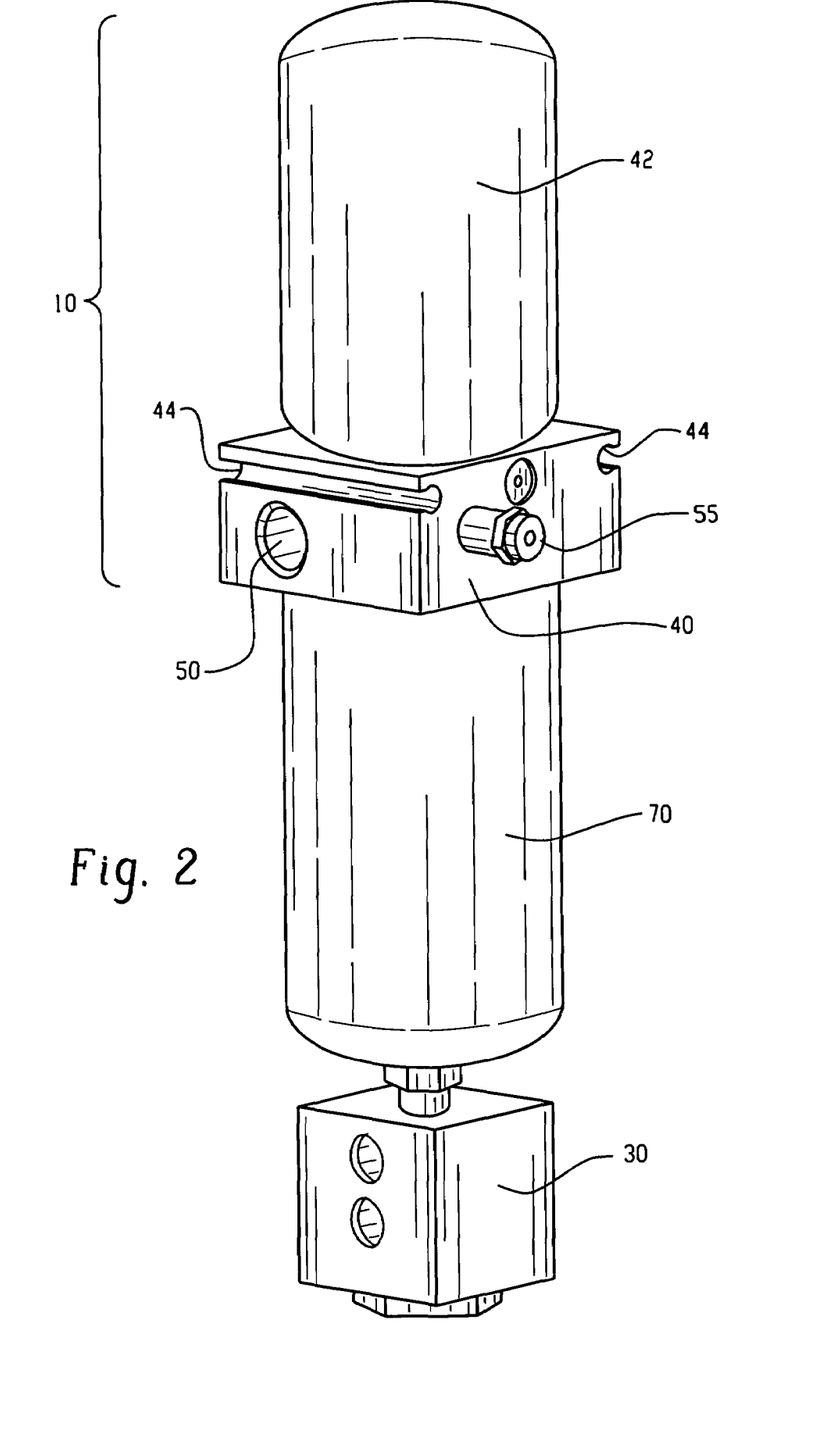
FIG. 2 is a perspective view of the oil separator of FIG. 1.
Figure 3:
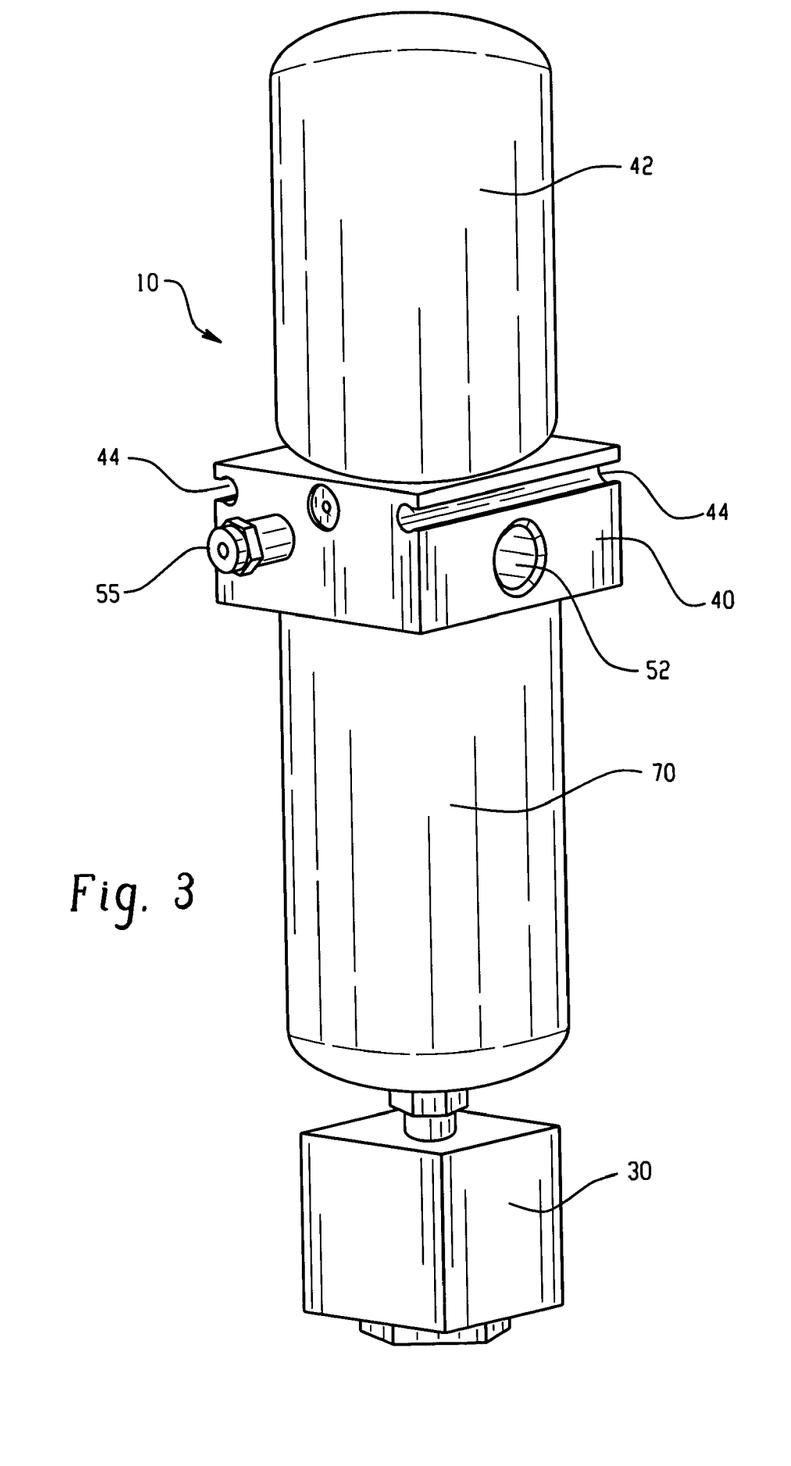
FIG. 3 is another perspective view of the oil separator of FIG. 1.
Figure 4:
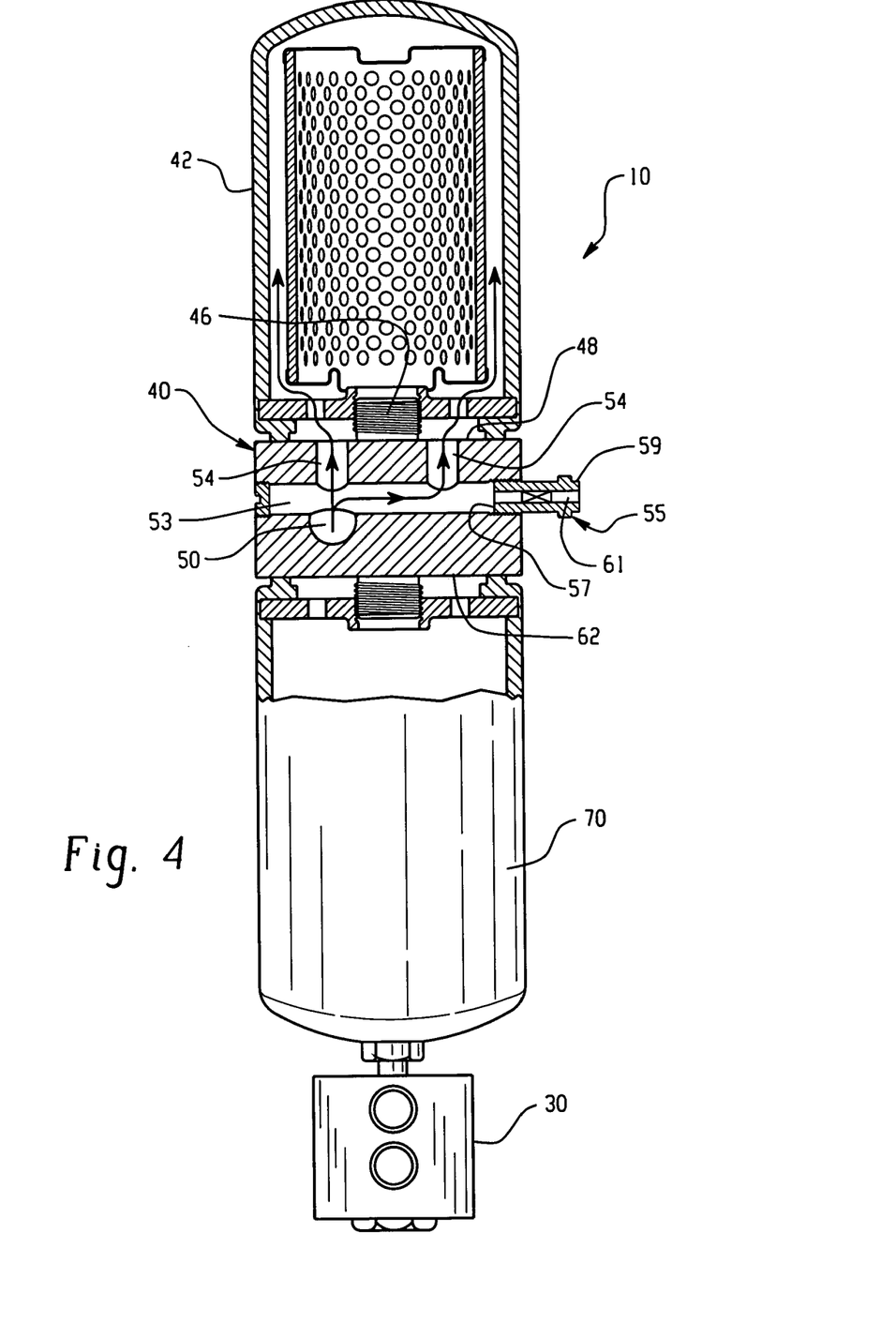
FIG. 4 is a sectional view of parts of the oil separator of FIG. 1 showing an inlet flow path to a cartridge that forms part of the oil separator.

The oil separator 10 (FIG. 2) includes a housing or fixture 40 and a cartridge 42. The fixture 40 is preferably machined from a single block of aluminum, although it could be made in another manner and from another material. The fixture 40 has grooves 44 on two opposing sides for securing the separator 10 on the vehicle. The fixture 40 has a threaded post 46 (FIG. 4) on a top surface 48 for connecting with the cartridge 42. The connection allows the cartridge 42 to rest or stand on the top surface 48 of the fixture 40 after being assembled to the fixture. The thread design for the threaded post 46 is specific to the attaching means of the cartridge 42.

Figure 5:
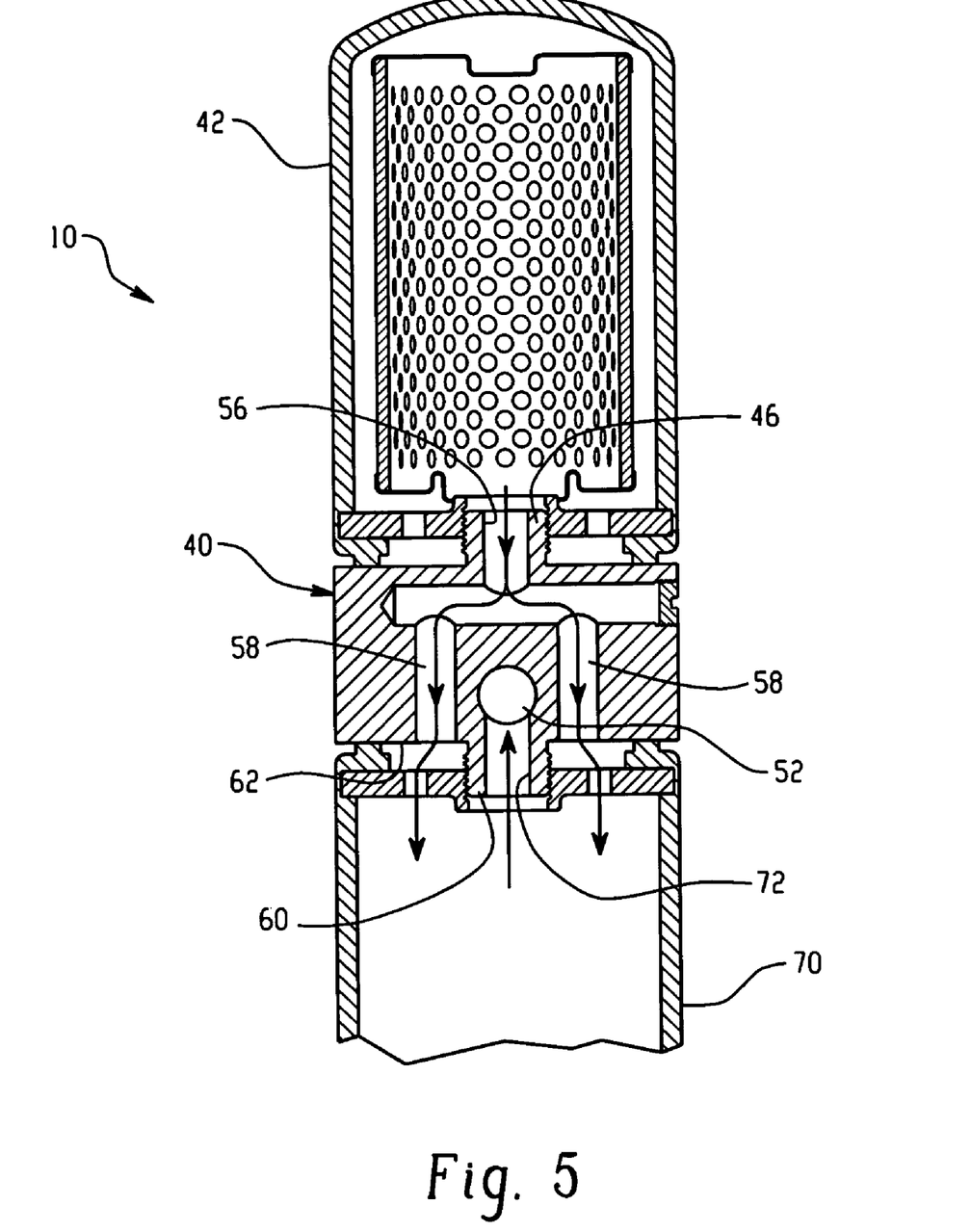
FIG. 5 is a sectional view similar to FIG. 4 showing an outlet flow path from the cartridge.
Figure 6:
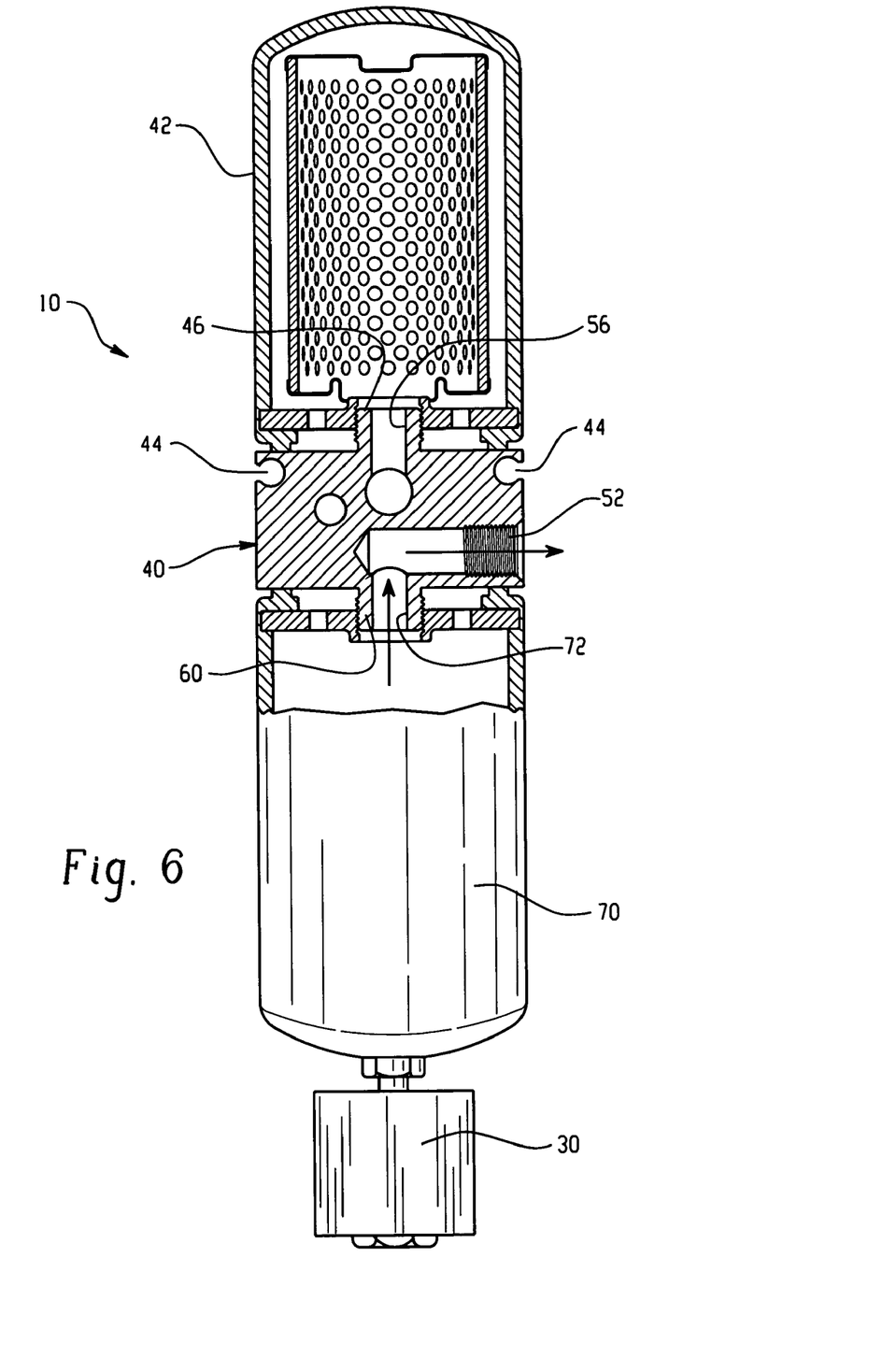
FIG. 6 is a sectional view similar to FIG. 4 showing an outlet flow path from a sump that forms part of the oil separator.

The fixture 40 (FIG. 4) includes a supply or inlet port 50 and a delivery or outlet port 52 (FIG. 5). The inlet port 50 receives pressurized air from the compressor 14. The inlet port 50 is connected internally in the fixture 40 by a cross-passage 53 with at least two internal ports 54. Preferably more than two of the ports 54 are provided, for example six to twelve ports. The ports 54 extend at right angles to the direction of air flow through the inlet port 50 and the cross passage 53, and connect the inlet port with the cartridge 42.

In the embodiment shown in FIGS. 1-7, the fixture 40 includes an exit passage 56 (FIG. 5 that extends through the threaded post 46. The exit passage 56 is in fluid communication with the interior of the cartridge 42. In the preferred embodiment, the exit passage 56 branches into at least two exit channels 58.

A threaded post 60 is provided on a bottom surface 62 of the fixture 40. The post 60 may be similar in configuration to the threaded post 46 on the top surface 48 of the fixture 40. A sump 70 is screwed on the post 60. The exit channels 58 communicate with the sump 70. The sump 70 has an exit passage 72 that extends through the threaded post 60 on the bottom surface 62 of the fixture 40. The exit passage 72 is connected to the delivery port 52.

In operation of the separator 10, compressed air is pumped to the separator from the compressor 14. Before entering the cartridge 42, the air flows through the inlet port 50 of the fixture 40. The flow of air branches off into the at least two inlet ports 54.

The size and number of the inlet ports 54 is selected to achieve a flow area that is equal to the flow area of the inlet port 50. The multiple inlet ports 54 to the cartridge 42 provide a free flow path for air coming from the compressor 14, thus reducing back pressure. This reduction in back pressure can increase the life and reliability of the compressor 14.

The flowing air must make at least one right angle turn from the inlet port 50 to move into the inlet ports 54. This re-direction of the air flow slows the air flow and creates turbulence. The multiple inlet ports 54 also help to disperse the oil throughout the cartridge 42. All these factors help to cause any oil that is entrained in the air to coalesce into droplets, and produce a better cleaning effect.

As the air flows through the cartridge 42, oil is separated from the air, condensing into large oil droplets. The exit passage 56 receives compressed air and oil droplets from the cartridge 42. The air and condensed oil flow through the passages 58 into the sump 70. The oil droplets are deposited and accumulated in the sump 70, mainly due to gravity.

The cleaned air exits from the sump 70 through its exit passage 72. The exit passage 72 is connected to the delivery port 52 which delivers the filtered compressed air downstream to the air dryer 18 (FIG. 1) through the air line 20.

Accumulated oil is periodically removed from the sump by the recycling valve 30. The recycling valve 30 (FIGS. 7 and 8) includes a housing 74. A cylinder 76 in the housing 74 supports a piston 78 for reciprocal sliding movement in the housing. The piston 78 is biased to a closed position (FIG. 7) in the cylinder by a spring or other biasing means 80. O-rings 82 on the piston 78 prevent leakage of oil and pressurized air past the piston to atmosphere.

The housing 74 of the recycling valve 30 includes an inlet port 84 that communicates with the sump 70. The inlet port 84 may be formed in differing manners and in the illustrated embodiment is formed in a hollow threaded post 86 that connects with an exit port of the sump 70. The housing 74 also includes an outlet port 90 for directing oil out of the recycling valve 30 and returning it to the engine or to the compressor 14. The outlet port 90 is located adjacent the inlet port 84.

In addition, the recycling valve 30 has a control port 92. The control port 92 is in fluid communication with the cylinder 76 within the recycling valve 30. The control port 92 is connected to a delivery port 94 (FIG. 1) of a governor 96 of the compressor 14. The control port 92 is effective to receive control air under pressure. The governor 96 monitors pressure downstream from the compressor 14.

Figure 7:
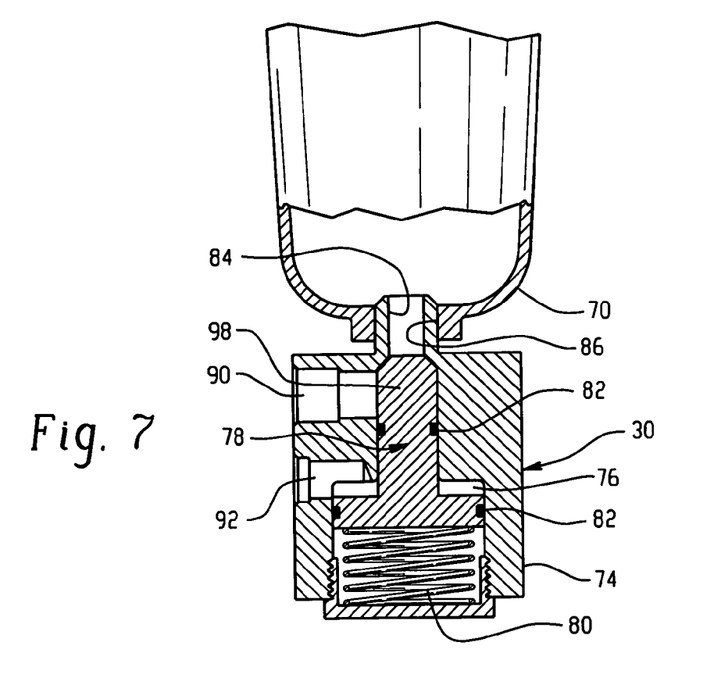
FIG. 7 is a sectional view through a recycling valve that forms part of the oil separator.
Figure 8:
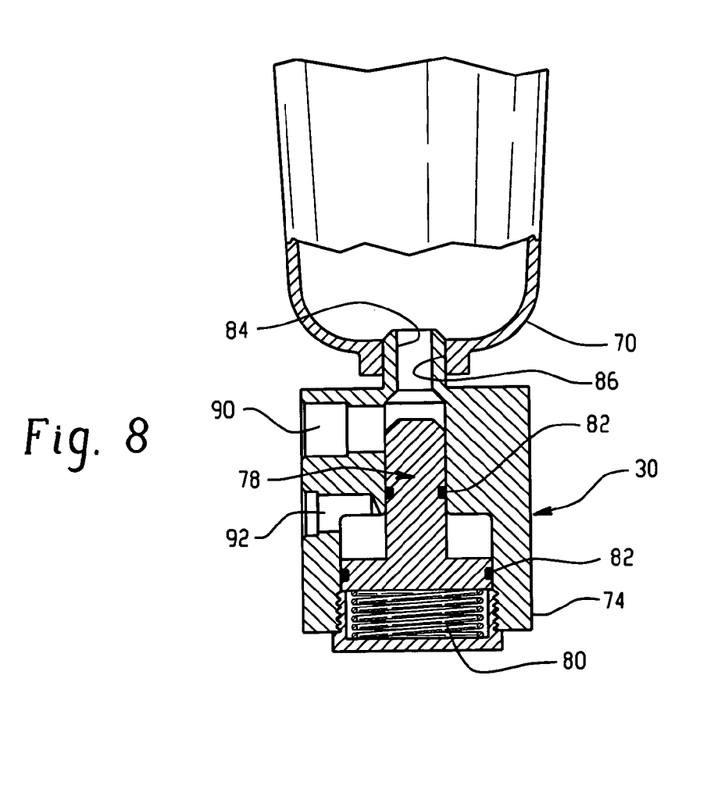
FIG. 8 is a sectional view similar to FIG. 7 showing parts of the recycling valve in an open condition.

When the valve 30 is in the closed condition shown in FIG. 7, a portion 98 of the piston 78 blocks fluid communication between the inlet port 84 and the outlet port 90. Oil that is accumulated in the sump 70 therefore remains in the sump.

The valve 30 may be actuated when the compressor 14 is unloaded, or at other preselected or predetermined times. Thus, in the preferred embodiment, if the pressure downstream of the oil separator 10 reaches a preset value, the compressor 14 unloads (stops sending air to the separator). As a result, a suitable control signal (control pressure) is applied to the control port 92. The piston 78 moves from the closed position shown in FIG. 7 to the open position shown in FIG. 8, against the bias of the spring 80. Fluid communication between the inlet port 84 and the outlet port 90 is established.

Oil from the sump 70 is free to flow out of the sump through the recycling valve 30. The residual air pressure in the sump 70 forces the oil to flow out through the valve 30 and return to the engine or compressor 14 of the vehicle, thus preventing waste and environmental damage. After a brief period of time, the pressure in the sump 70 diminishes, the control signal at the control port 92 is removed, and the recycling valve 30 closes.

Figure 9:
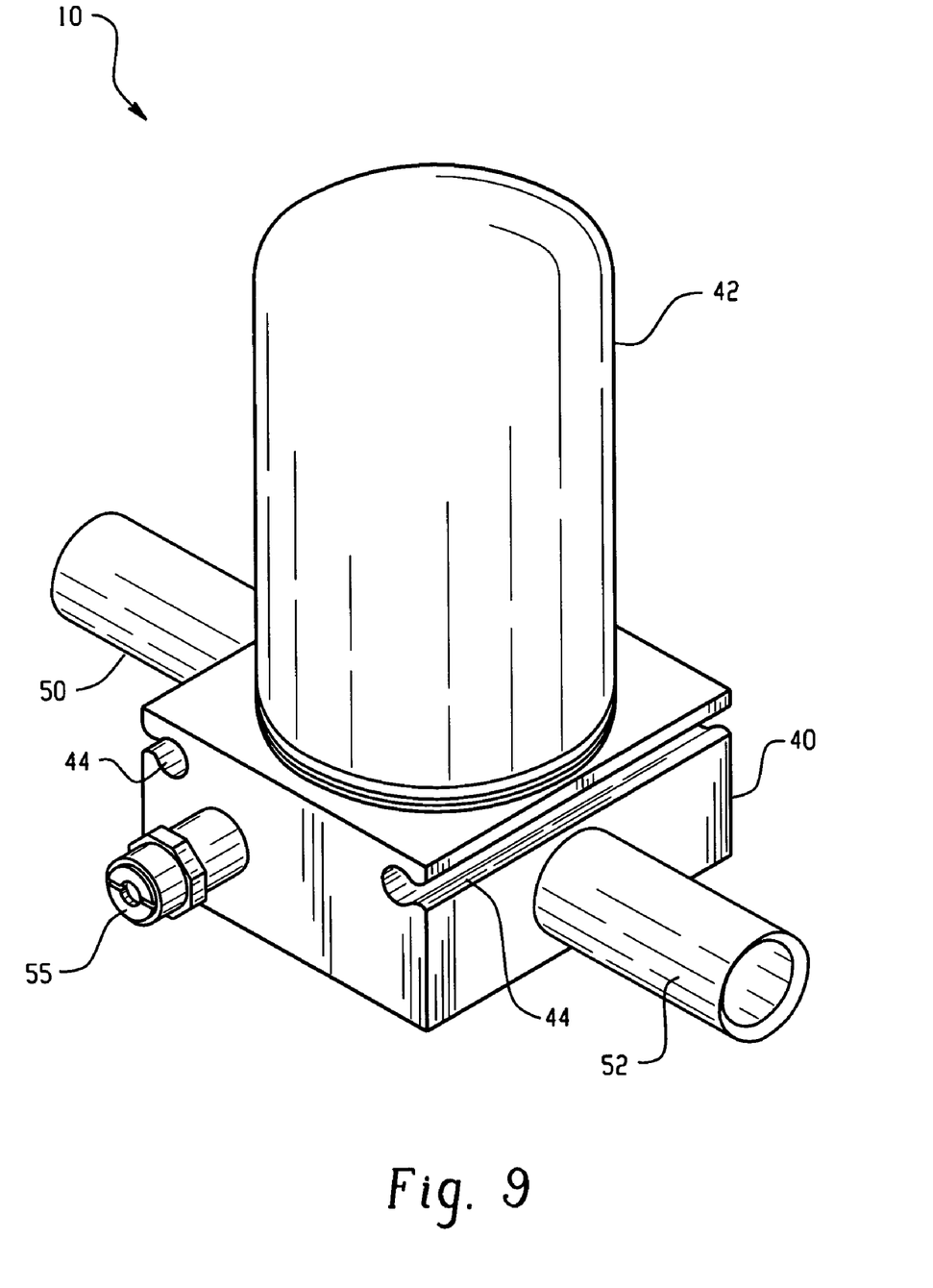
FIG. 9 is a perspective view of an oil separator constructed in accordance with a second embodiment of the invention.
Figure 10:
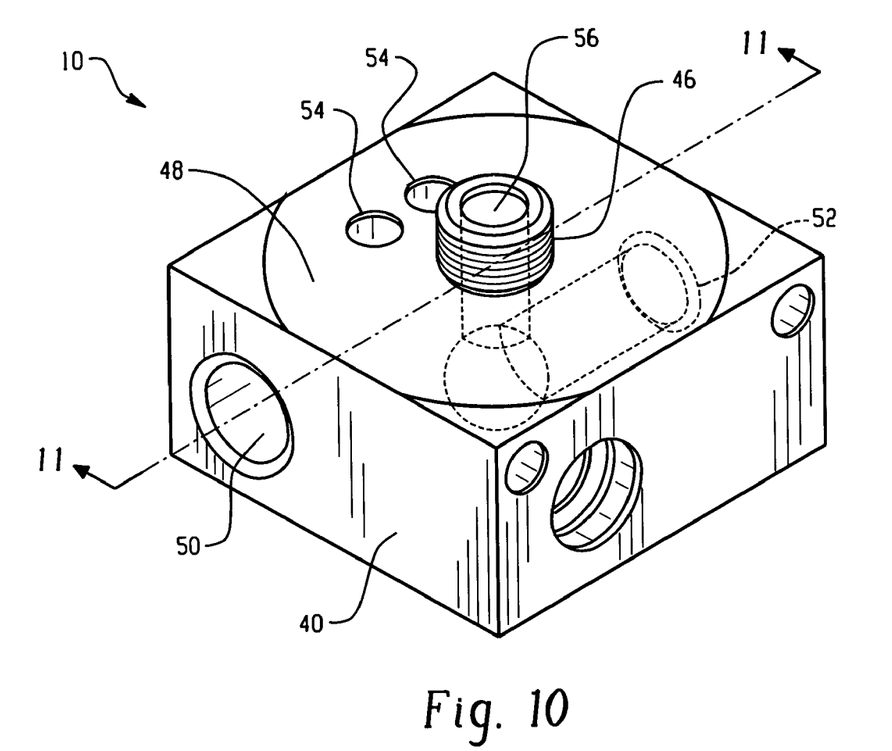
FIG. 10 is a perspective view of a fixture that forms part of the oil separator of FIG. 9.
Figure 11:
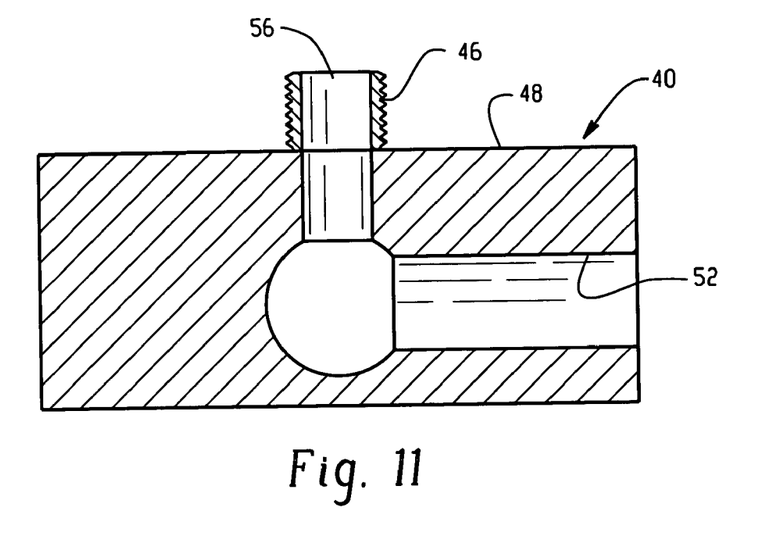
FIG. 11 is a sectional view taken generally along line 11-11 of FIG. 10.

FIGS. 9-11 illustrate an alternative embodiment in which the fixture 40 is not connected to a sump. In this embodiment, the exit passage 56 through the threaded post 46 on the top surface 48 of the fixture 40 is connected to the delivery port 52. With this embodiment, another means for collecting the oil condensed into droplets must be provided, instead of the sump 70 and the recycling valve 30. This alternative means would be located between the delivery port 52 of the housing fixture 40 and the air dryer 18.

In accordance with another feature of the invention, a pressure relief valve 55 (FIGS. 2-4) is provided for the oil separator 10. The pressure relief valve 55 may be located at any point in the air flow path between the compressor 14 and the oil separator 10, and does not have to be directly attached to or form a part of the separator itself.

In the illustrated embodiment, the relief valve 55 is mounted on the fixture 40 of the separator 10. The relief valve 55 may be a commercially available pressure relief valve. A first end or inlet end 57 of the relief valve 55 is in fluid communication with the supply port 50 via the cross passage 53. A second end or outlet end 59 of the relief valve 55 projects outward of the fixture 10 to atmosphere. A normally closed air flow passage 61 extend between the inlet end 57 and the outlet end 59.

The pressure relief valve 55 is set to be activated when the supply pressure to the separator 10 as sensed at the relief valve equals or exceeds a predetermined level or set value. The predetermined level is based on a variety of factors. These factors include, but are not necessarily limited to, the maximum working pressure of the compressor, the volume of flow, the rating of connecting hoses or lines, and the rating of the cartridge 42. The predetermined value is set during manufacturing and, because the relief valve 55 as installed is tamper resistant, the set value cannot be changed. The predetermined value may be 225 psi, for example, If the supply port 50 or one or more of the passages 54 or the cartridge 42 becomes partially or completely clogged with carbon from the oil in the air, the oil separator is not able to accept the amount of air pumped out from the compressor 60. Air pressure builds up at the supply port 50. If the air pressure reaches the predetermined maximum level, the pressure relief valve 55 is activated, allowing air to flow out of the fixture 40 to atmosphere. This action releases the excessive pressure that might otherwise cause damage to the compressor 14 and other upstream components.

The exiting of the compressed air through the pressure relief valve 55 creates an audible indication to the operator that the supply pressure is greater than the delivery pressure and that as a result the braking system might not function properly. In an alternative embodiment, the relief valve 55 may provide a warning signal that is electrical, for example, visually signaling the operator with a light, such as an LED, that a problem has occurred.

Although the invention has been described in detail with reference to certain preferred embodiments, other embodiments are possible. For example, the separator is usable in an air system other than a braking system. Therefore, the spirit and scope of the appended claims should not be limited to the description of the described embodiments.

We claim:

1. An oil separator for use in a vehicle compressed air system, comprising:
   a fixture for mounting said oil separator to a vehicle;
   an oil separator cartridge connected with said fixture for coalescing oil in a first flow of air that is supplied to said oil separator; and
   a recycling valve that is selectively operable in response to increases and decreases in air pressure of a control signal that is a second flow of air from the vehicle compressed air system and that is separate from said first flow of air that is supplied to said oil separator for removing coalesced oil from said oil separator.

2. Apparatus as set forth in claim 1 including a sump mounted adjacent said cartridge for collecting the coalesced oil, said recycling valve being connected to said sump and including an inlet port for draining oil from said sump, an outlet port for removing oil from said valve, and a control port for controlling operation of said valve.

3. Apparatus as set forth in claim 2 wherein said outlet port 90 directs oil out of said recycling valve and returns it to an engine or compressor with which said oil separator is associated.

4. An oil separator as set forth in claim 2 wherein said recycling valve is operable to remove coalesced oil from said oil separator under the influence of compressed air in said sump.

5. An oil separator as set forth in claim 1 wherein said recycling valve includes a piston movable in a cylinder in response to a control air pressure to open said recycling valve.

6. An oil separator as set forth in claim 4 wherein said recycling valve includes an inlet port in fluid communication with said cartridge through a sump and also includes an outlet port, said piston blocking communication between said inlet port and said outlet port when said valve is in a closed position, said piston being movable in response to a control air pressure from the closed position to an open position enabling fluid to flow out of said sump through said inlet port and said outlet port.

7. An oil separator as set forth in claim 6 wherein coalesced oil is removed from said sump under the influence of compressed air in said sump when said valve is in the open position.

8. An oil separator as set forth in claim 7 wherein said fixture comprises a first threaded member for fastening said oil separator cartridge to said fixture and a second threaded member for fastening said sump to said fixture, said fixture including at least one passage extending between upper and lower surfaces of said fixture for delivering air and coalesced oil to said sump for collection of the oil.

9. An oil separator as set forth in claim 1 further including a sump and wherein said fixture comprises a first threaded member for fastening said oil separator cartridge to said fixture and a second threaded member for fastening said sump to said fixture, said fixture including at least one passage extending between upper and lower surfaces of said fixture for delivering air and coalesced oil to said sump for collection of the oil.

10. An oil separator as set forth in claim 1 wherein said fixture is a single block of metal and includes a supply port for allowing air from a compressor into said fixture and a delivery port for allowing the air to exit said oil separator after being coalesced.

11. An oil separator as set forth in claim 1 wherein said fixture includes an inlet port for allowing air from a compressor into said fixture and a delivery port for allowing air to exit said oil separator after being cleaned, said fixture including a plurality of ports extending from said inlet port for directing air from said inlet port into said cartridge, said plurality of ports having a combined flow area at least equal to the flow area of said inlet port.

12. An oil separator as set forth in claim 11 wherein said plurality of ports extend at an angle to the direction of flow of air through said inlet port.

13. An oil separator as set forth in claim 1 further including a pressure relief valve in fluid communication with said oil separator cartridge for releasing air from said oil separator in response to air pressure reaching a predetermined amount.

14. An oil separator as set forth in claim 13 wherein said pressure relief valve creates an audible signal upon releasing air.

15. An oil separator as set forth in claim 1 wherein said separator creates an audible signal in response to air pressure in said separator reaching a predetermined amount.

16. A method comprising the steps of:
   directing allow of compressed air of a vehicle compressed air system into a cartridge of an oil separator and through a coalescing medium in the cartridge to coalesce oil in the compressed air;

collecting the coalesced oil in a sump attached to the oil separator; and selectively a recycling valve attached to the sump to enable coalesced oil to flow out of the sump in response to increases and decreases in air pressure of a control signal from the vehicle compressed air system that is separate from the flow of compressed air that is directed to the cartridge of the oil separator.

17. A method as set forth in claim 16 further comprising the step of forcing the coalesced oil to flow out of the sump through the recycling valve under air pressure from the sump.

18. A method as set forth in claim 16 wherein said opening step includes directing a control air signal to said recycling valve and moving a piston in response.

19. A method as set forth in claim 16 wherein said directing step includes directing compressed air to flow into the cartridge through a plurality of inlet ports having a flow area that is preselected not to limit air flow.

20. A method as set forth in claim 19 wherein the plurality of inlet ports extend at right angles to an initial air flow direction in the oil separator.

21. A method as set forth in claim 16 further comprising the step of releasing air from a safety relief valve on said oil separator in response to air pressure reaching a predetermined level.

22. An oil separator for use in a vehicle air system, comprising:
a fixture for mounting said oil separator to a vehicle; and
an oil separator cartridge connected with said fixture for coalescing oil in air supplied to said oil separator;
said fixture including an inlet port for allowing air from a compressor into said fixture and a delivery port for allowing air to exit said oil separator after being cleaned;
said fixture including a plurality of ports extending from said inlet port for directing air from said inlet port into said cartridge, said plurality of ports having a combined flow area at least equal to the flow area of said inlet port.

23. An oil separator as set forth in claim 22 wherein said plurality of ports extend at an angle to the direction of flow of air through said inlet port.

24. An oil separator as set forth in claim 22 wherein said fixture is made from a single piece of metal.

25. An oil separator as set forth in claim 22 further including a pressure relief valve in fluid communication with said inlet port for releasing air from said oil separator in response to air pressure reaching a predetermined amount.

26. An oil separator as set forth in claim 25 wherein said pressure relief valve is mounted on said fixture and creates an audible signal upon releasing air.

27. A vehicle compressed air system, comprising:
a compressor for compressing air;
an air dryer for drying the compressed air;
a fixture for mounting said oil separator to a vehicle; and
an oil separator in line between the compressor and the air dryer, including an oil separator cartridge attached to said fixture for coalescing oil in air supplied to said oil separator;
said fixture including an inlet port for allowing air from said compressor into said fixture and a delivery port for allowing air to exit said oil separator after being cleaned;

an air line for delivering air from said fixture to said air dryer;

said fixture including a pressure relief valve in fluid communication with said inlet pod for releasing air from said oil separator in response to air pressure reaching a predetermined amount;

wherein said pressure relief valve is mounted on said fixture and creates an audible signal upon releasing air.

28. An oil separator as set forth in claim 27 wherein said fixture includes a plurality of ports extending from said inlet port for directing air from said inlet port into said cartridge, said plurality of ports having a combined flow area at least equal to the flow area of said inlet port.

29. An oil separator as set forth in claim 28 wherein said plurality of ports extend at an angle to the direction of flow of air through said inlet port.

30. An oil separator as set forth in claim 27 further including a recycling valve for removing coalesced oil from said oil separator.

31. An oil separator as set forth in claim 30 including a sump connected with said cartridge for collecting the coalesced oil, said recycling valve being connected to said sump and including an inlet port for draining oil from said sump, an outlet port for removing oil from said valve, and a control port for controlling operation of said valve.

32. An oil separator as set forth in claim 31 wherein said recycling valve is operable to remove coalesced oil from said oil separator under the influence of compressed air in said sump.

33. An oil separator as set forth in claim 1 wherein as compressed air flows through the oil separator cartridge, oil is separated from the compressed air, condensing into large oil droplets;
the fixture having an exit passage that receives compressed air and oil droplets from the cartridge, the compressed air and condensed oil flowing through the exit passage into a sump in which the oil droplets are deposited and accumulated, clean compressed air exiting from the sump through a sump exit passage in said fixture.

34. An oil separator as set forth in claim 1 wherein the first flow of air that is supplied to said oil separator flows through a coalescing medium in said cartridge on which medium particles of oil collect and coalesce.

35. A method as set forth in claim 16 wherein the step of directing a flow of compressed air of a vehicle compressed air system into a cartridge of an oil separator and through a coalescing medium in the cartridge comprises collecting and coalescing particles of oil from the flowing compressed air on the coalescing medium in the cartridge.

* * * * *